I. JACKSON.
BELT FASTENER.
APPLICATION FILED MAR. 27, 1909.

1,073,494.

Patented Sept. 16, 1913.

2 SHEETS—SHEET 1.

Witnesses:
L. Hoskinson
J. J. McCauley

Inventor:
Isaac Jackson
by Foster Freeman Watson & Coit
Attys.

COLUMBIA PLANOGRAPH CO., WASHINGTON, D. C.

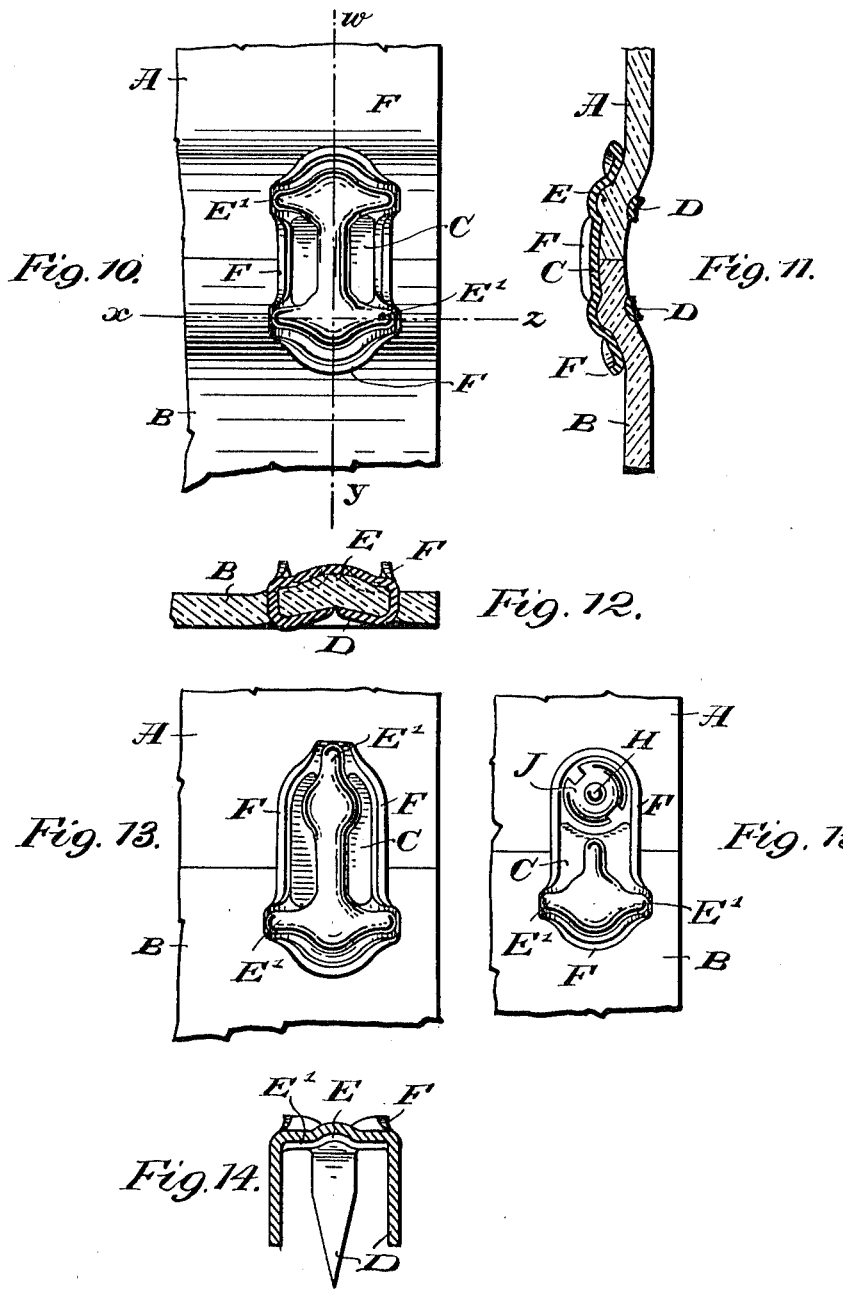

UNITED STATES PATENT OFFICE.

ISAAC JACKSON, OF GLOSSOP, ENGLAND.

BELT-FASTENER.

1,073,494.  Specification of Letters Patent.  Patented Sept. 16, 1913.

Application filed March 27, 1909. Serial No. 486,228.

*To all whom it may concern:*

Be it known that I, ISAAC JACKSON, a subject of the King of Great Britain and Ireland, and a resident of Glossop, in the county of Derby, England, have invented new and useful Improvements in and Relating to Belt-Fasteners, of which the following is a specification.

This invention relates to fasteners for machine driving belts and to like fastening devices of that type in which teeth are formed upon or are attached to a metal plate and are driven or passed through the substance of the belt and clenched over to secure the fastening plate in place upon the belt or belt ends.

Figure 1:
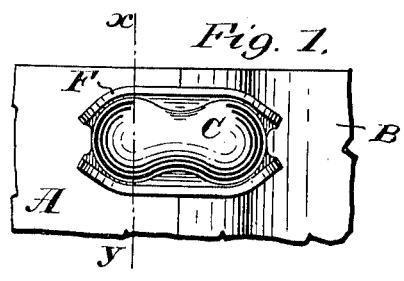
Figure 2:
Figure 3:
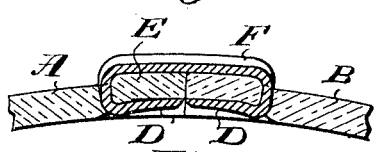
Figure 4:
Figure 5:
Figure 6:
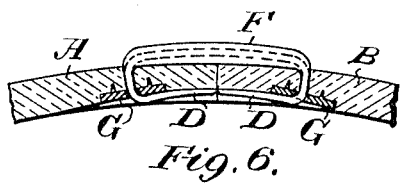
Figure 7:
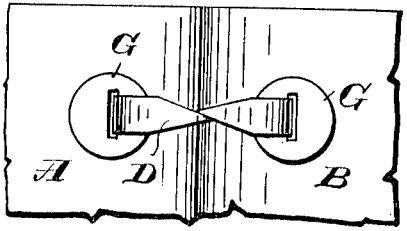
Figure 8:
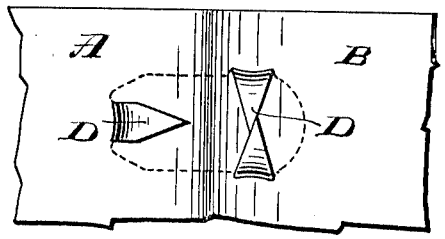
Figure 9:
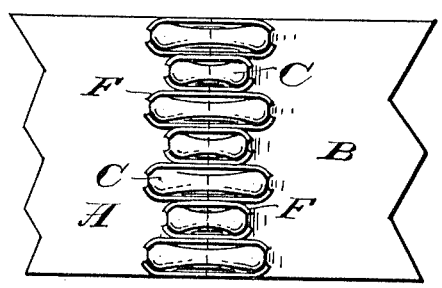

In the accompanying drawings, Figure 1 is a face or plan view of a belt fastener constructed in accordance with the invention, showing the same applied to a belt; Fig. 2 is a plan of the opposite face of the fastener from that shown in Fig. 1, the fastener being removed from the belt; Fig. 3 is a longitudinal sectional view of the fastener applied to a belt; Fig. 4 is a transverse sectional view on the line $x$—$y$ Fig. 1; Fig. 5 is a perspective view illustrating a slightly different form of tooth from that shown in Figs. 1 to 4; Figs. 6 and 7 are respectively a longitudinal section and plan of another form of the fastener; Fig. 8 illustrates in plan view a fastener having a slightly different arrangement of teeth; Fig. 9 is a plan of a belt joint formed by a plurality of the improved fasteners; Fig. 10 is a plan view of another form of the fastener, showing the same applied to a belt; Fig. 11 is a sectional view on the line $w$—$y$ Fig. 10; Fig. 12 is a sectional view on the line $x$—$z$ Fig. 10; Figs. 13 and 14 illustrate in plan and cross section respectively another form of the fastener; Fig. 15 illustrates a form in which two different fastening means are employed.

Referring to the drawings, and particularly to Figs. 1 to 4, A and B represent the belt ends which are to be joined and C is the fastener. As will be seen it consists of a stamped metallic plate having teeth D at its opposite ends, and domed or other concavities E on its inner face between such teeth. It is evident that if a plate formed simply as described has its teeth clenched into position upon the belt in the positions indicated in Fig. 3, that the domes would be flattened and would not permit the required displacement of the belt substance into the concavities of the fastener, nor the depression of the clenched teeth below the driving surface of the belt as also shown in the same figure. To prevent this flattening of the domes and to permit the desired effect represented in Fig. 3, the edges of the plate are turned upward to form a marginal wall F which projects higher than the domes. When the face of a plate is laid on an anvil or the like for hammering down of the teeth the edges of these walls take up the force of the blow and prevent flattening of the domes. To prevent cutting of the belt the bases of the upturned walls which contact with the belt are preferably rounded. Instead of making the securing teeth in the form shown in Figs. 1 to 4, such teeth may be made convex on their inner surface, as illustrated in the perspective in Fig. 5.

Figs. 6 and 7 illustrate a form of joint and fastener of the type shown in Figs. 1 to 5, but the teeth, instead of being simply clenched upon and into the driving surface of the belt, pass through suitable washers G on the driving surface of the belt and thus obtain an extended grip. Such washers may be separate for the two teeth of the fastener and may be spiked on the inner faces as shown in Fig. 6.

A further modification of the improved fastener is shown in Fig. 8. In this fastener the plate is shown as having two teeth on opposite sides at one end and one tooth at the other.

Fig. 9 represents in plan a belt joint formed with the aid of several of the improved fastening plates C laid side by side. In the arrangement illustrated alternate plates are longer than those contained between them so that the substance of the belt is not cut or perforated in a straight line across for the passage of the teeth.

A still further modified form of fastener is illustrated in Figs. 10 to 12. The form of fastener shown in Figs. 10 to 12 has four teeth D one at each side at each end but is otherwise of like construction to the plates shown in the earlier figures.

The form of fastener illustrated in Figs. 13 and 14 is somewhat similar to that illustrated in Fig. 8 in that it has one tooth at one end and two at the other. The single tooth at one end is, however, longer than the teeth at the other end.

Fig. 15 illustrates still another form of fastening plate having teeth at one end and a removable or easily detachable fastening device such as a bolt H and nut J at the other end.

The concavities, corrugations or the like E on the inner face of a plate preferably extend right up to the roots of the teeth D. If these corrugations do not, in the manner usual in existing fasteners, extend right up to the roots, then there is danger of the belt being cut or crushed or broken between the base of the bent portion of the teeth and the part of the plate which is not recessed.

In Figs. 1 to 5 the main concavities E are shown as extending right up to the roots of the teeth; in Figs. 10, 13, 14 and 15, the main concavities are shown as provided with subsidiary concavities or corrugations E¹ which extend up to the roots of the teeth and permit the displacement of belt substance under the teeth when they are clenched over and also stiffen the roots of the teeth. The under surface of a fastener plate may be provided with two or more concavities for belt displacement or a single such concavity may extend the length or breadth of the fastener from tooth to tooth or from teeth to teeth.

In the form of fastener shown in Figs. 1 to 15 the upturned marginal wall is not continuous around the whole of the edge of the fastener, and is preferably so formed as to gradually merge into the edges of the teeth where the latter project from the other face of the plate as is clearly shown in certain of the figures. Such a construction materially strengthens and stiffens the teeth and their attachment to the plate. The marginal wall or flange materially stiffens the plate and the latter is additionally stiffened by the concavities which extend throughout its length. The teeth D themselves may be flat or straight as shown in Fig. 5 or they may be formed with a convex side to come against the surface of the belt. This convexity may be formed by pressing or stamping the teeth to the required shape as shown in Figs. 2 and 4. This formation assists in clearing the teeth out of the way of the pulley as the convexity of the inner surface of the tooth more intimately beds the belt substance into the concavity in the plate and the concave face of the tooth comes against the pulley. A further advantage of such form of tooth is that the risk of cutting the belt by a clenched tooth is still further diminished. The same advantages may be gained by simple rounding the inner face of a tooth.

The improved fastener plate is preferably slightly curved in the manner indicated in Figs. 3, 6 and 11 so as to approximate somewhat to the curvature of the pulleys with which it will be used. The ends of the teeth may be oppositely tapered to different extents so that they will slightly pass each other laterally when clenched over.

In a co-pending application Serial No. 486,227 there is illustrated and described a fastener embodying the construction herein referred to, but no claim is made in such other application to the features of novelty of the fastener disclosed by both applications and particularly described in the following claims.

Having thus described the invention what is claimed is:—

1. A belt fastener comprising a metal plate having teeth projecting from one face thereof and having a marginal wall projecting from the other face and merging into the edges of the teeth.

2. A belt fastener adapted to overlap and connect the ends of a belt comprising a metal plate with upturned side flanges, a pointed tooth extending transversely across said plate at the end and constituting a down-turned continuation of said plate and flanges, the said plate being provided with a concavity in its under surface in which said tooth and the material of the belt compressed thereby lies when bent down, and means at the other end of the plate for securing it to the belt.

3. A belt fastener adapted to overlap and connect the ends of a belt comprising a metal plate with upturned side flanges, a pointed tooth extending transversely across said plate at each end and constituting a down-turned continuation of said plate and flanges, the said plate being provided with upwardly bent central portions at the ends constituting concavities in which said teeth and the material of the belt compressed thereby lie when bent over, and with a strengthening corrugation joining the concavities.

In witness whereof I have hereunto set my hand in the presence of two subscribing witnesses.

ISAAC JACKSON.

Witnesses:
 WILLIAM GEO. HEYS,
 JOHN O'CONNELL.